(12) United States Patent
Hoshaw

(10) Patent No.: US 7,454,273 B2
(45) Date of Patent: Nov. 18, 2008

(54) INFORMED MEMORY ACCESS FOR VEHICLE ELECTRONIC MODULES

(75) Inventor: Steven E. Hoshaw, Milford, MI (US)

(73) Assignee: Harman International Industries, Incorporated, Northridge, CA (US)

( * ) Notice: Subject to any disclaimer, the term of this patent is extended or adjusted under 35 U.S.C. 154(b) by 733 days.

(21) Appl. No.: 10/922,801

(22) Filed: Aug. 20, 2004

(65) Prior Publication Data

US 2006/0041350 A1    Feb. 23, 2006

(51) Int. Cl.
    *G06F 7/00* (2006.01)
(52) U.S. Cl. .............................. 701/36; 701/29; 701/33; 701/35; 701/53; 340/438; 340/439
(58) Field of Classification Search ................... 701/29, 701/33, 36, 35, 53; 340/425.5, 438, 439
    See application file for complete search history.

(56) References Cited

U.S. PATENT DOCUMENTS

| | | | |
|---|---|---|---|
| 4,902,628 A * | 2/1990 | Blair | 436/132 |
| 5,483,692 A | 1/1996 | Person et al. | |
| 5,508,594 A * | 4/1996 | Underwood et al. | 318/139 |
| 5,773,962 A | 6/1998 | Nor | |
| 5,787,367 A | 7/1998 | Berra | |
| 5,950,117 A | 9/1999 | Zorer | |
| 6,069,833 A | 5/2000 | Koura | |
| 6,182,171 B1 | 1/2001 | Akatsuka et al. | |
| 6,456,904 B1 | 9/2002 | Gay | |
| 6,587,573 B1 | 7/2003 | Stam et al. | |
| 6,663,010 B2 | 12/2003 | Chene et al. | |
| 6,670,788 B2 | 12/2003 | Prabhu et al. | |
| 2002/0004694 A1 * | 1/2002 | McLeod et al. | 701/29 |
| 2004/0068700 A1 | 4/2004 | Noujeim et al. | |

FOREIGN PATENT DOCUMENTS

| | | |
|---|---|---|
| DE | 19630757 A1 | 2/1997 |
| DE | 19940871 A1 | 5/2000 |
| EP | 1083475 A1 | 3/2001 |

* cited by examiner

*Primary Examiner*—Gertrude Arthur Jeanglaud
(74) *Attorney, Agent, or Firm*—Brinks Hofer Gilson & Lione

(57) ABSTRACT

A vehicle electronic module receives vehicle bus messages from a vehicle communication bus interface. The vehicle bus messages may include vehicle status data. The electronic module may determine whether a memory safety condition has been met based on the vehicle status data. The electronic module may delay reading or writing data, such as diagnostic data, into a non-volatile memory until the memory safety condition is reached. The data is read from or stored in the non-volatile memory with reduce risk of corrupted data.

37 Claims, 3 Drawing Sheets

INFORMED MEMORY ACCESS FOR VEHICLE ELECTRONIC MODULES

BACKGROUND OF THE INVENTION

1. Technical Field

This invention relates to vehicle electronic modules. In particular, the invention relates to a system for safely accessing memory in a vehicle electronics system, uncorrupted by power system fluctuations or other hostile electrical environmental factors.

2. Related Art

The electronic technologies supporting and incorporated into cars, trucks, and other vehicles, driven by strong market demand, have matured rapidly and become quite powerful in a short time period. Vehicle electronics systems include fundamental electronic modules ranging from engine controllers to anti-lock braking systems. In addition, vehicle electronic modules now commonly adapt sophisticated consumer technologies to the vehicle, including global positioning systems, cellular telephones, and high quality stereo sound systems.

Some electronic modules that implement the vehicle electronics system are connected to a vehicle communication bus, and to a power source ultimately derived from the voltage provided by the vehicle battery. At each vehicle ignition cycle, the electronic modules initialize and begin internal diagnostic checks. The diagnostic results are then written into a long-term memory and may be beneficially used during the continuing operation of the vehicle, may be used as a significant source of troubleshooting information for mechanics, or may be used or for other reasons.

The vehicle ignition cycle generates a hostile environment for the electronic modules. As the electronic modules begin to draw power and initialize they may induce severe inductive spikes, low voltages, and high frequency noise onto the vehicle battery line and other parts of the wiring harness. Coupled with relay chatter, ignition cycling, and the effects of magnetic induction on the wiring harness, the electronic modules may experience a hostile environment that is not conducive to stable or reliable operation. The hostile environment often causes corrupted data to be written into the long term memories, thereby destroying the data and making the data useless for helping to achieve the benefits noted above.

A need has long existed for addressing the problems noted above and others previously experienced.

SUMMARY

A vehicle electronic module performs memory access in an informed manner that enhances the reliability of data written to or read from memory. The electronic module may receive information over a communication channel such as a communication bus that informs the electronic module of the environment in which the module operates. When the environment is conducive to memory access, the module may proceed with memory reads, memory writes, or other memory operations.

The electronic module may include a vehicle communication bus interface, a memory, and a processor connected to the vehicle communication bus interface and the memory. The processor may receive vehicle bus messages that may include vehicle status data from the communication bus interface. The processor may also determine whether a memory safety condition has been met. The processor may delay memory access until the memory safety condition is reached.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as stored in program, data, or multipurpose system memories, all or part of systems and methods consistent with the technology may be stored on or read from other machine-readable media, for example, secondary storage devices such as hard disks, floppy disks, and CD-ROMs; electromagnetic signals; or other forms of machine readable media either currently known or later developed.

Furthermore, although this specification describes specific components of a vehicle electronics system, methods, systems, and articles of manufacture consistent with this technology may include additional or different components, implemented in logic and/or circuitry, or in other manners. For example, a processor may be implemented as a microprocessor, microcontroller, digital signal processor (DSP), application specific integrated circuit (ASIC), discrete logic, and/or a combination of other types of circuits or logic acting as explained below. The safety test program discussed below may be a function, subroutine, or in-line test code present in another program, may be a separate program, may be distributed across several memories and processors, or may be partially or wholly implemented without software as a hardware realization of the processing discussed below.

Figure 1:
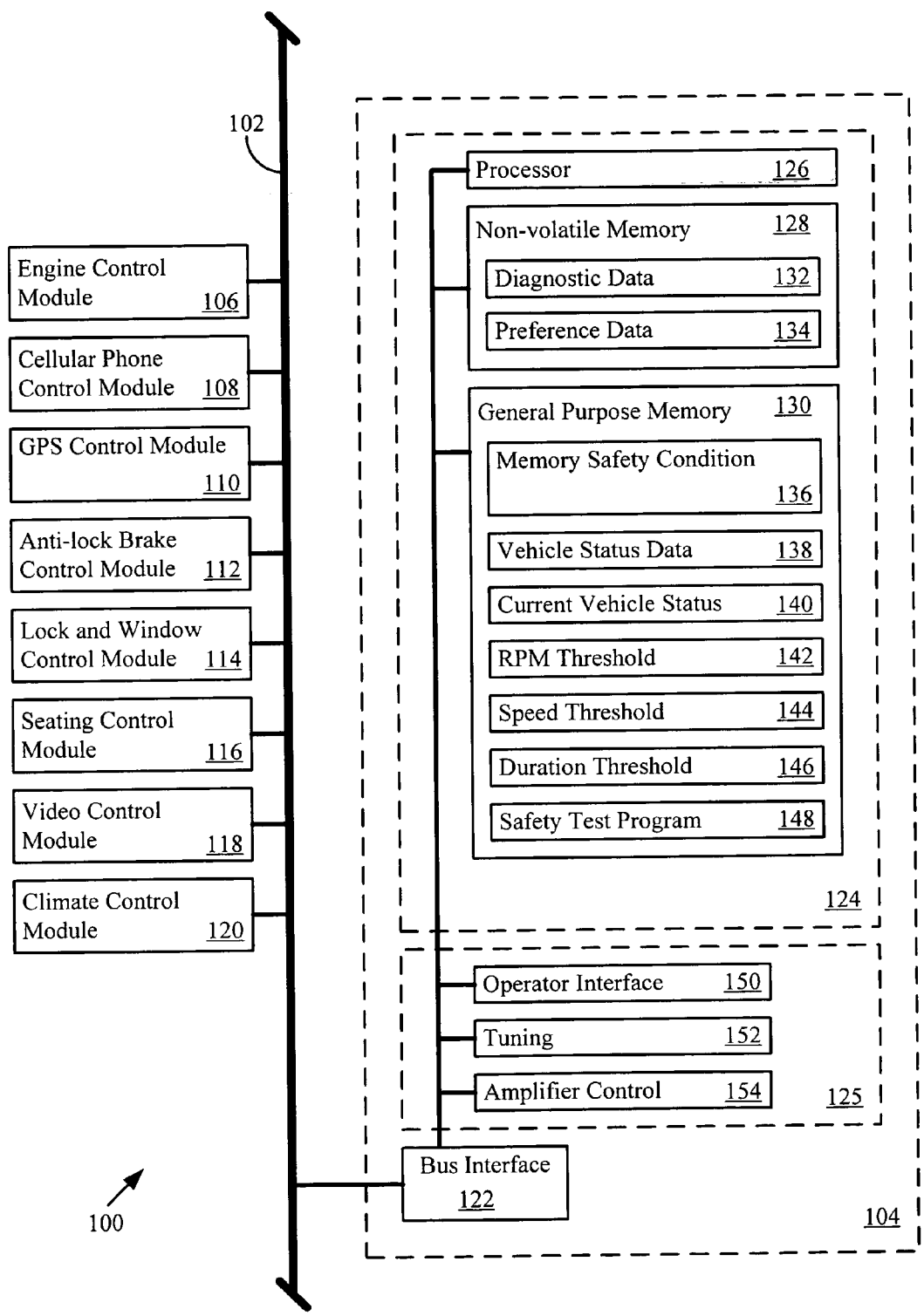
FIG. 1 is a vehicle electronics system.

In FIG. 1, a vehicle electronics system 100 may include a vehicle communication bus 102, a radio control module 104, and other electronic modules 106, 108, 110, 112, 114, 116, 118, and 120. The electronic modules 104-120 are not limited to the form or function described below. The vehicle may incorporate any electronic module or distribution of electronic modules that implements any processing performed in the vehicle.

The electronic modules 106-120 may include an engine control module 106, for governing the vehicle engine operation; a cellular phone control module 108, for transmitting and receiving cellular phone signals; and a global positioning system control module 110, for overseeing vehicle positioning, route finding, or other navigation tasks. Other examples of electronic control modules include the anti-lock brake control module 112, for governing the operation of the vehicle brakes; the lock and window control module 114, for operating electric locks and power windows; and the seating control module 116, for handing seat positioning or seat warming. A video control module 118 may administer a DVD player and LCD display or other video display, and a climate control module 120 may monitor and maintain vehicle climate settings.

The radio control module 104 may include a vehicle communication bus interface 122, a processing system 124, and a control system 125. The processing system 124 may include a processor 126, a non-volatile memory 128, and a general purpose memory 130. The non-volatile memory 128 may store diagnostic data 132, occupant preference data 134, and/or other data.

The general purpose memory 130 may store programs and/or program data for the processor 126. The general purpose memory 130 may store a memory safety condition 136, vehicle status data 138, and a current vehicle status 140. The general purpose memory 130 also may store an RPM threshold 142, a speed threshold 144, and a duration threshold 146. The processor 126 may execute a safety test program 148 that also may be stored in the general purpose memory 130.

The control system 125 may include an operator interface 150, a tuning section 152, and an amplifier control section 154. The operator interface 150 may include operator controls that influence the operation of a radio. The tuning section 152 may include filters, mixers and circuitry that tunes to selected radio stations. The amplifier control section 154 may include amplifiers, amplification control, filters, and other circuitry that drives one or more vehicle speakers.

The vehicle communication bus 102 may couple to each electronic control module 104-120. The vehicle communication bus 102 may be a Controller Area Network (CAN) bus, serial bus, Local Interconnect Network (LIN) bus, or any other type of vehicle bus. The bus interface 122 may include interface circuitry appropriate for the vehicle communication bus 102, such as a CAN interface, a serial bus interface, or a LIN interface. Vehicle bus messages may be transmitted and received on the vehicle communication bus 102 by any of the electronic control modules 104-120.

The processor 126 may govern the operation of the radio control module 104. The processor 126 may perform diagnostic checks of the circuitry or logic 122, 126, 128, 130, or other circuits and perform a memory write of the diagnostic data 132 into the non-volatile memory 128. The processor 126 may also store operator preference data 134 such as volume pre-sets, balance settings, equalizer settings, radio station preferences, and other preference data in the non-volatile memory 128.

A hostile environment may be present in the vehicle electrical system, particularly during vehicle startup and initialization of the electronic control modules 104-120. In that environment, the processor 126 may determine when memory access will occur. The memory data access may include memory reads, memory writes, or other access to the non-volatile memory 128. The reads and/or writes may be controlled to occur at times when there is less risk of data corruption due to electromagnetic interference affecting the processor 126, memories 128-130, and/or signal connections between the electronic modules 104-120, processor 126, and/or memories 128-130. The processor 126 may execute the safety test program 148 to determine when memory data access may occur with less chance of data corruption due to the effects of the hostile electrical environment.

The memory safety condition 136 may include, as components of the safety condition, one or more restrictions, states, factors, and/or logical tests. The memory safety condition 136 may be chosen to reflect conditions that signify an absence of a hostile electrical environment in the vehicle, such as the absence of inductive spikes, high frequency noise, and/or other environmental factors. The general purpose memory 130 may also store test thresholds such as the RPM threshold 142, speed threshold 144, and duration threshold 146. The processor 126 may determine whether the memory safety condition 136 is met to determine whether to proceed with memory access.

Figure 2:
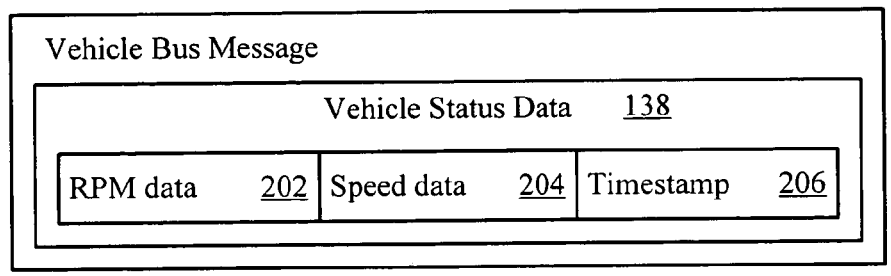
FIG. 2 is a vehicle bus message.

In FIG. 2, an example of a vehicle bus message 200 is present. The vehicle bus message 200 may include vehicle status data 138 that the processor 126 may store in the general purpose memory 130. The vehicle status data 138 may include measurements of vehicle operating parameters taken intermittently, in real-time, at pre-selected intervals, or at any other time. The vehicle status data 138 may include RPM data 202, such as the current engine RPM; speed data 204, such as the current vehicle speed; and time data 206, such as a timestamp that indicates the current time and/or the time at which the vehicle status data 138 was measured.

The vehicle bus message 200 may originate from the engine control module 106 or any other control module. The radio control module 104 may monitor the bus interface 122 for vehicle bus messages. In other implementations, the radio control module 104 may transmit a vehicle status request message on the vehicle communication bus 102 to prompt a control module 106-120 for vehicle status data updates.

The processor 126 receives the vehicle bus messages 200 and obtains the vehicle status data 138. The processor 126 may establish, maintain, or track the current vehicle status 140 in the general purpose memory 130 by analyzing the vehicle status data 138. Over time, the processor may track the elapsed time since engine start, since RPMs have exceeded a threshold, since the vehicle has reached a threshold, or may track other conditions. The processor may also, over time, determine and maintain an average, maximum, minimum or other statistical parameter of RPMs, speed, or other conditions.

Figure 3:
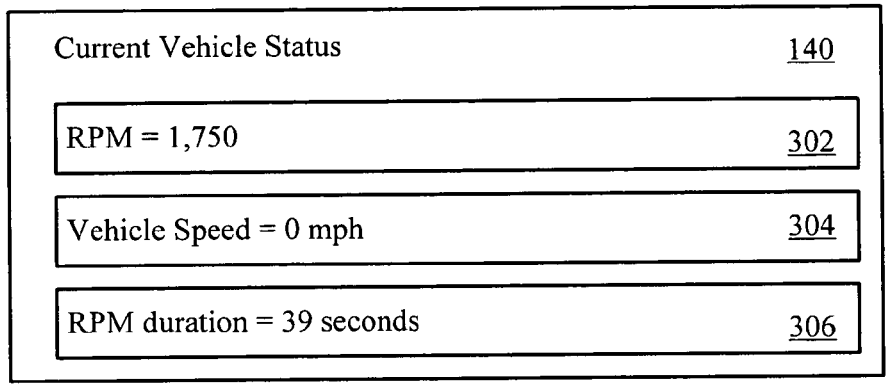
FIG. 3 are vehicle statuses.

FIG. 3 shows that the vehicle status 140 may include a current engine RPM 302, a current vehicle speed 304, and an RPM duration 306. The RPM duration 306 may be time data that represents the amount of time that the vehicle RPM has exceeded the RPM threshold 142 (e.g., a vehicle idle RPM) or another threshold. Other vehicle statuses may be determined, maintained, or tracked over time based on the vehicle status data 138 or on other data. The processor 126 may employ the vehicle status 140 to determine when one or more memory safety conditions 136 have been met.

Figure 4:
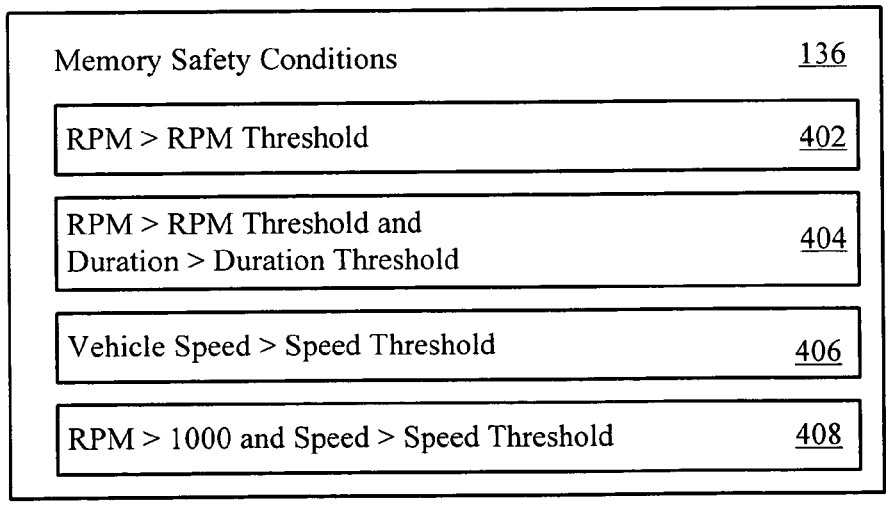
FIG. 4 are memory safety conditions.

In FIG. 4, examples of memory safety conditions 136 are present. The safety condition 402 is met when the vehicle RPM exceeds the RPM threshold 142, for example 1,000 RPM. The safety condition 404 is met when the vehicle RPM has exceeded the RPM threshold 142 for more than the Duration threshold 146, for example 30 seconds. The safety condition 406 is met when the vehicle speed exceeds the Speed threshold 144, for example 5 miles per hour. The safety condition 408 is met when the vehicle RPM exceeds the RPM threshold 142 and the vehicle speed is greater than the Speed threshold. The thresholds 142-146 may identify relatively safe times or conditions for accessing the non-volatile memory 128.

Other safety conditions may be established, and may employ one or more vehicle statuses obtained from any of the electronic modules 104-120 in conjunctive or disjunctive relation. For example, a safety condition may be defined in terms of another vehicle engine condition, a vehicle reaching a GPS coordinate, being connected to a cellular base station, or any other vehicle status.

The processor 126 may delay memory access until the current vehicle status 140 or vehicle status data 138 meets one or more memory safety conditions 136. Assuming that the processor 126 employs the safety condition 404, then the processor 126 may compare the RPM duration status 306 against the safety condition 404. The processor 126 may delay non-volatile memory access until the RPM has exceeded the RPM threshold 142 for more than the Duration threshold 146. When the vehicle status meets a selected memory safety condition, then the processor 126 may proceed with memory access to the non-volatile memory 128. Because the hostile electrical environment has stabilized, the processor 126 may read and write data to the non-volatile memory 128 with reduced risk of corrupted data.

The memory safety conditions 136 may be pre-established in the memory 128 or the memory 130. An external programming interface may couple to the vehicle electronics system to establish, modify or select applicable memory safety conditions 136 for the vehicle. Additionally or alternatively, the processor 126 may read pre-stored memory safety conditions 136 from the non-volatile memory 128 upon initialization, establish the memory safety conditions 136 in the general purpose memory 130, then change, delete, and/or add one or more memory safety conditions in response to operator input, electrical system measurements, bus messages, or other input.

Figure 5:
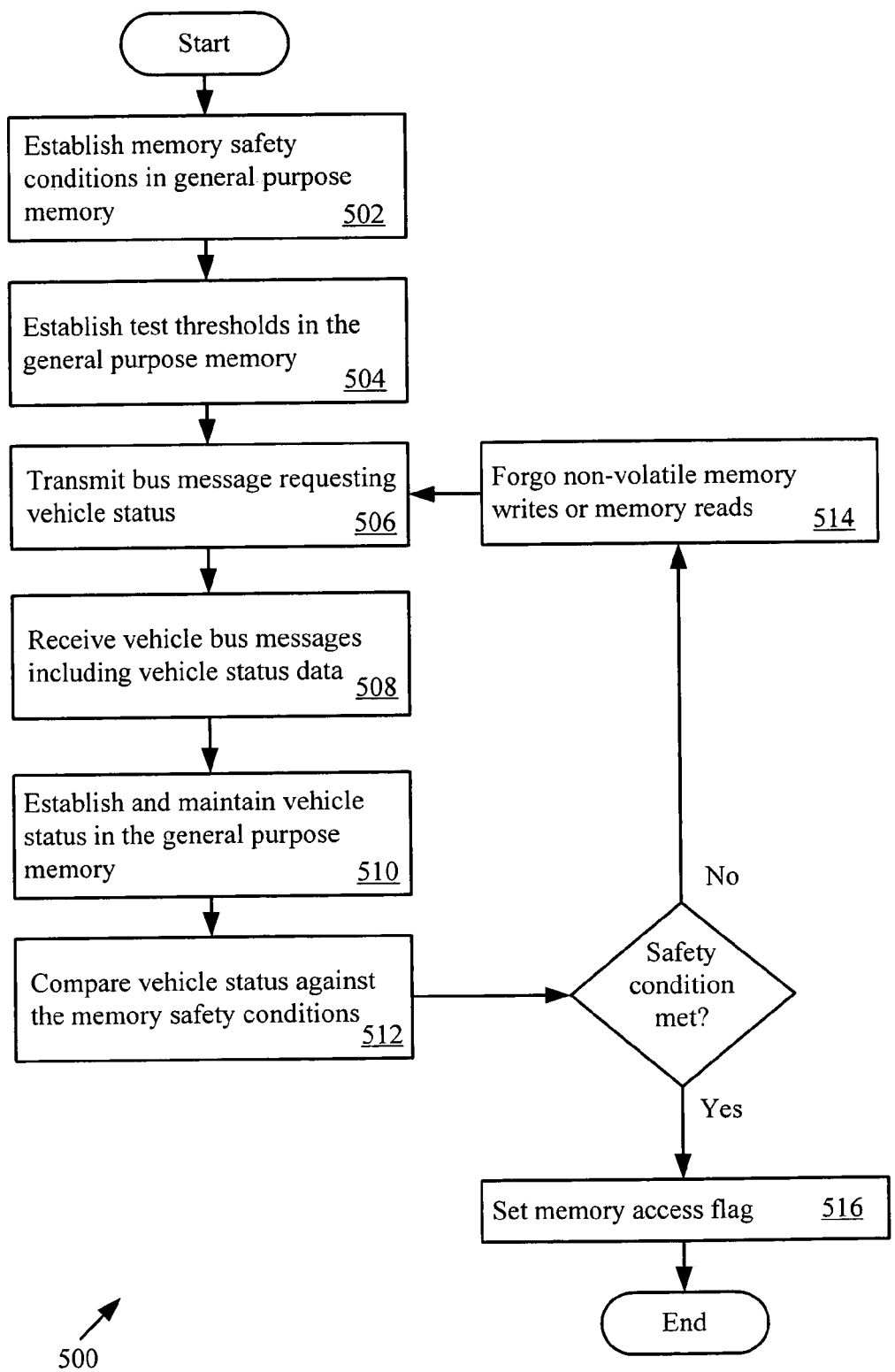
FIG. 5 shows the acts that a safety test program may take when determining whether a processor may access memory.

In FIG. 5, a flow diagram 500 summarizes the acts that may be taken by the radio control module 104 or any other vehicle electronic module 106-120. Executed by the processor 126, the memory safety test program 148 may perform one or more of the acts shown in FIG. 5. The radio control module 104 may establish memory safety conditions 136 in the general purpose memory 130 (Act 502). The radio control module 104 also may establish test thresholds 142, 144, 146 in the general purpose memory 130 (Act 504).

The electronic module 104 may transmit a bus message that requests the vehicle status (Act 506). As vehicle bus messages 200 reach the bus interface 122, the processor 126 receives the vehicle bus messages 200 including the vehicle status data 138 (Act 508). Using the vehicle status data 138, the processor 126 may maintain, track, or otherwise establish the vehicle status 140 over time in the general purpose memory 130 (Act 510).

The processor 126 compares the vehicle status 140 against the memory safety conditions 136 (Act 512). Informed by the results of the comparison, the processor 126 may perform memory access or may delay memory access. If one or more memory safety conditions 136 are not met, then the processor 126 may forgo non-volatile memory writes, memory reads, or other memory operations, such as a memory erase (Act 514). Otherwise, the processor 126 may set a flag that indicates that non-volatile memory writes, reads, or other access may proceed (Act 516). The processor 126 may subsequently check the flag to determine whet her the processor 126 may perform memory access to the non-volatile memory 128.

The vehicle electronic modules 104-120 may thereby write data into the non-volatile memory 128 with less chance of data corruption. The memory safety conditions 136 help to ensure that the hostile electrical environment often present in the vehicle electrical system has returned to stability. The diagnostic data 132, for example, may be more reliable and more effective in its role to assist technicians with diagnosing vehicle problems. The preference data 134 may more accurately represent operator preferences and contribute to customer satisfaction with the vehicle.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A vehicle electronic module comprising:
   a vehicle communication bus interface;
   a memory; and
   a processor coupled to the vehicle communication bus interface and the memory, the processor operable to:
      receive vehicle status data transmitted to the vehicle bus interface;
      determine from at least a portion of the vehicle status data that a memory safety condition is met; and
      delay access to the memory until the memory safety condition is met.

2. The vehicle electronic module of claim 1, where the vehicle status data comprises Revolutions per Minute (RPM) data and where the memory safety condition comprises an RPM threshold.

3. The vehicle electronic module of claim 1, where the vehicle status data comprises vehicle speed data and where the memory safety condition comprises a vehicle speed threshold.

4. The vehicle electronic module of claim 1, where the access to the memory comprises a memory write access.

5. The vehicle electronic module of claim 4, where the memory safety condition comprises an RPM threshold and an RPM duration threshold.

6. The vehicle electronic module of claim 4, where the memory safety condition comprises an RPM threshold and a vehicle speed threshold.

7. The vehicle electronic module of claim 1, where the memory comprises a non-volatile memory.

8. The vehicle electronic module of claim 1, where the vehicle status data is present in a vehicle bus message received by the processor.

9. The vehicle electronic module of claim 1, where the vehicle status data comprises a timestamp.

10. A machine readable medium encoded with instructions that cause a vehicle electronic module processor to perform a method comprising:
    receiving a vehicle bus message;
    obtaining vehicle status data from the vehicle bus message;
    comparing the vehicle status data to a memory safety condition; and
    delaying a memory access until the memory safety condition is met.

11. The machine readable medium of claim 10, where the vehicle status data comprises Revolutions per Minute (RPM) data and where the memory safety condition comprises an RPM threshold.

12. The machine readable medium of claim 10, where the vehicle status data comprises vehicle speed data and where the memory safety condition comprises a vehicle speed threshold.

13. The machine readable medium of claim 10, where the vehicle status data comprises time data, and further comprising the act of determining a duration during which RPMs are above an RPM threshold.

14. The machine readable medium of claim 10, further comprising the act of determining RPMs and vehicle speed from the vehicle status data.

15. The machine readable medium of claim 10, where the act of delaying a data write into a memory comprises delaying the data write into a non-volatile memory.

16. The machine readable medium of claim 10, where the memory access comprises a data write comprising diagnostic data.

17. The vehicle electronic module of claim 10, where the memory access comprises a data write comprising vehicle operator preference settings.

18. A method in a vehicle electronic module for safely writing data to memory, the method comprising:
   receiving a vehicle bus message comprising vehicle status data transmitted to a vehicle bus interface of a vehicle electronic module;
   maintaining a current vehicle status based on the vehicle status data; and
   delaying a memory access until a memory safety condition is met, based on the current vehicle status.

19. The method of claim 18, where the act of maintaining a current vehicle status comprises determining a duration for which RPMs have exceeded an RPM threshold.

20. The method of claim 18, where the act of maintaining a current vehicle status comprises tracking vehicle speed.

21. The method of claim 18, where the memory safety condition is a vehicle speed threshold.

22. The method of claim 18, where the memory access comprises a diagnostic data memory write.

23. The method of claim 18, where the act of delaying a memory access comprises delaying a memory data write to a non-volatile memory.

24. A processing system for a vehicle electronic module, the processing system comprising:
   a non-volatile memory;
   a processor coupled to the non-volatile writable memory; and
   a general purpose memory coupled to the processor, the program memory encoded with instructions that cause the processor to perform a method comprising:
      monitoring a vehicle communication bus interface for vehicle bus messages arriving at the vehicle communication bus interface;
      receiving a vehicle bus message;
      obtaining vehicle status data from the vehicle bus messages;
      maintaining a vehicle status over time based on the vehicle status data received in the vehicle bus messages;
      comparing the vehicle status to a memory safety condition; and
      delaying a memory access by the processor into the non-volatile writable memory until the vehicle status meets the memory safety condition.

25. The processing system of claim 24, where the vehicle status data comprises Revolutions per Minute (RPM) data and where the memory safety condition comprises an RPM threshold.

26. The processing system of claim 24, where the vehicle status data comprises vehicle speed data and where the memory safety condition comprises a vehicle speed threshold.

27. The processing system of claim 24, where the memory safety condition comprises an RPM threshold and an RPM duration threshold.

28. The processing system of claim 24, where the vehicle status data comprises a timestamp.

29. The processing system of claim 24, where the memory access comprises a diagnostic data memory write.

30. A vehicle electronic module comprising:
   means for receiving vehicle status data transmitted on a communication bus;
   means for comparing the vehicle status against a memory safety condition; and
   means for delaying a memory access until the memory safety condition is met.

31. The vehicle electronic module of claim 30, further comprising:
   means for storing data responsive to the memory access.

32. The vehicle electronic module of claim 31, further comprising:
   means for non-volatilely storing data responsive to the memory access.

33. The vehicle electronic module of claim 31, further comprising:
   means for interfacing to the communication bus.

34. A product comprising:
   a machine readable medium;
   instructions contained on the machine readable medium that receive vehicle status data transmitted to a vehicle bus interface;
   instructions contained on the machine readable medium that maintain a current vehicle status based on the vehicle status data; and
   instructions contained on the machine readable medium that delay a memory access until a memory safety condition is met, based on the current vehicle status.

35. The product of claim 34, where the instructions that maintain the current vehicle status comprise instructions that determine a duration for which RPMs have exceeded an RPM threshold.

36. The product of claim 34, where the instructions that maintain the current vehicle status comprise instructions that determine a duration for which speed has exceeded a vehicle speed threshold.

37. The product of claim 34, where the memory access comprises a diagnostic data memory write.

* * * * *